United States Patent [19]
Yoshino

[11] Patent Number: 5,754,366
[45] Date of Patent: May 19, 1998

[54] ELECTRONIC DEVICE CONTAINER HAVING AN AIR HOLE SCREENED WITH A HARMFUL GAS ADSORBENT

[75] Inventor: Hiroshi Yoshino, Tokyo, Japan

[73] Assignee: NEC Corporation, Tokyo, Japan

[21] Appl. No.: 679,800

[22] Filed: Jul. 15, 1996

[30] Foreign Application Priority Data

Jul. 13, 1995 [JP] Japan ............................ 7-177268

[51] Int. Cl.⁶ ........................................ G11B 33/14
[52] U.S. Cl. .......................................... 360/97.02
[58] Field of Search ............................. 360/97.02

[56] References Cited
U.S. PATENT DOCUMENTS 4,863,499  9/1989  Osendorf ................................ 55/316
5,030,260  7/1991  Beck et al. ............................. 55/316
5,147,691  9/1992  Shimamoto et al. ............... 360/97.02
5,409,515  4/1995  Yamamoto et al. .................. 55/341.1
5,500,038  3/1996  Dauber et al. .......................... 96/135
5,515,214  5/1996  Kiyonaga et al. .................. 360/97.02

*Primary Examiner*—John H. Wolff
*Attorney, Agent, or Firm*—Young & Thompson

[57] ABSTRACT

A magnetic disk storage unit has a sealing container accommodating at least a magnetic disk and at least a magnetic head and being provided with at least an air hole through which air pass between interior and exterior to adjust a pressure of an internal gas within the sealing container, wherein the air hole is provided with a gas adsorbent comprising carbon fibers made from a high polymer having cyano groups.

6 Claims, 1 Drawing Sheet

ELECTRONIC DEVICE CONTAINER HAVING AN AIR HOLE SCREENED WITH A HARMFUL GAS ADSORBENT

BACKGROUND OF THE INVENTION

The present invention relates to a magnetic disk storage unit, and more particularly to a magnetic disk storage unit having a sealing container which accommodates magnetic disks for storing any information and magnetic heads for recording/reproducing the information, wherein the sealing container is provided with an air hole for adjusting a difference in pressure between outside air and inside air.

A typical one of the conventional magnetic disk storage units will be described with reference to FIG. 1, wherein the magnetic disk storage unit has a sealing container which accommodates a plurality of magnetic disks 11 for storage any information and a plurality of pairs of magnetic heads 12 being positioned to sandwich the corresponding magnetic disks 11 for recording/reproducing the information, but being floated from the magnetic disks 11 via gaps due to a high speed rotation of the magnetic disks 11. The magnetic heads 12 are supported by a carriage 13 which is driven by a motor 14 to do positioning of the magnetic heads 12. The sealing container comprises a base 17, on which the magnetic heads 12, the magnetic disks 11, the carriage 13 and the motor 14 are placed, and a cover 16 placed on the base 17. The cover 16 has gaskets 15 through which air can pass.

The purpose of having the magnetic disks 11 and the magnetic heads 12 accommodated in the sealing container is to prevent dusts from being adhered on the magnetic disks 11 and the magnetic heads 12. If any dust is adhered on the magnetic disks 11 or the magnetic heads 12, the magnetic disks 11 or the magnetic heads 12 may receive any damage whereby the stored information is lost.

However, the complete sealing of the magnetic disks 11 and the magnetic heads 12 raises problems as follows. In the sealing container, the movable and active elements such as the motor 14 generates a heat which raises a temperature of the inside air whereby a pressure of the inside air is raised. This causes a variation in the amount of floating of the magnetic head 12 from the magnetic disks 11 which affects the operation of recording and reproducing the information.

In order to prevent the above problem, it is effective to provide a bleeder 18 either on the base 17 and the cover 18 so that air passes through bleeder 18 between the inside and outside of the magnetic disk storage unit. The bleeder 18 is provided with a filter 19 for preventing the dust from entering into the inside of the magnetic disk storage unit.

Whereas the filter 19 prevents the dusts from entering into the inside of the magnetic disk storage unit, it is difficult to prevent harmful gases such as an oxide of sulfur (SOX) and an oxide of nitrogen (NOX) from entering into the same, wherein the harmful gases such as SOX and NOX are capable of corrosion of the internal elements accommodated in the sealing container. Further, it is possible that the harmful gases such as SOX and NOX enter into the magnetic disk storage unit via the gasket 15 and any gap between assembling screws and the sealing container.

In order to prevent the harmful gases such as SOX and NOX from entering into the magnetic disk storage unit, it was proposed to provide an adsorbent on the bleeder 18. This technique is disclosed in the Japanese laid-open patent publications Nos. 62-184685 and 4-134783.

Alternatively, it was also proposed to provide activated carbon within the sealing container of the magnetic disk storage unit in order to reduce the concentration of the harmful gases such as SOX and NOX. This technique is disclosed in the Japanese laid-open patent publication No. 05-144248.

Further alternatively, it was also proposed to use a filter coated with copper or silver which acts as an adsorbent to the harmful gases such as SOX and NOX. This technique is disclosed in the Japanese laid-open patent publication No. 05-109260.

It is required that the gas adsorbent has a large surface area and a large adsorption capability, for which reason it is recommended to use the activated carbon and noble metals. However, a gas adsorption capability of the above adsorbent per unit weight is small, for which reason in order to obtain the adsorbent of the harmful gases, it is necessary to use a large amount of the above adsorbent. If it is difficult to use the large amount of the above adsorbent, it is difficult to reduce the concentration of the harmful gases such as SOX and NOX.

SUMMARY OF THE INVENTION

Accordingly, it is an object of the present invention to provide a novel magnetic disk storage unit free from the problems as described above.

It is a further object of the present invention to provide a novel magnetic disk storage unit adopted to prevent harmful gases such as SOX and NOX from entering into an interior of a sealing container thereof.

It is an object of the present invention to provide a novel magnetic disk storage unit free from the problems as described above.

It is an object of the present invention to provide a novel electric device adopted to prevent harmful gases such as SOX and NOX from entering into an interior of a sealing container thereof.

The present invention provides a novel magnetic disk storage unit having a sealing container accommodating at least a magnetic disk and at least a magnetic head and being provided with at least an air hole through which air pass between interior and exterior to adjust a pressure of an internal gas within the sealing container, wherein the air hole is provided with a gas adsorbent comprising carbon fibers made from a high polymer having cyano groups. It is preferable that the high polymer comprises acrylonitrile high polymer.

The present invention provides a novel electric device having a sealing container for accommodating internal electric elements which are likely to be corroded by an inorganic gas. The sealing container having at least an air hole through which air pass between interior and exterior to adjust a pressure of an internal gas within the sealing container, wherein the air hole is provided with a gas adsorbent comprising carbon fibers made from a high polymer having cyano groups for an adsorption of at least an inorganic gas which is capable of corroding the magnetic disk. It is preferable that the high polymer comprises acrylonitrile high polymer.

BRIEF DESCRIPTIONS OF THE DRAWINGS

Preferred embodiments of the present invention will be described with reference to the accompanying drawings.

PREFERRED EMBODIMENT

Figure 1:
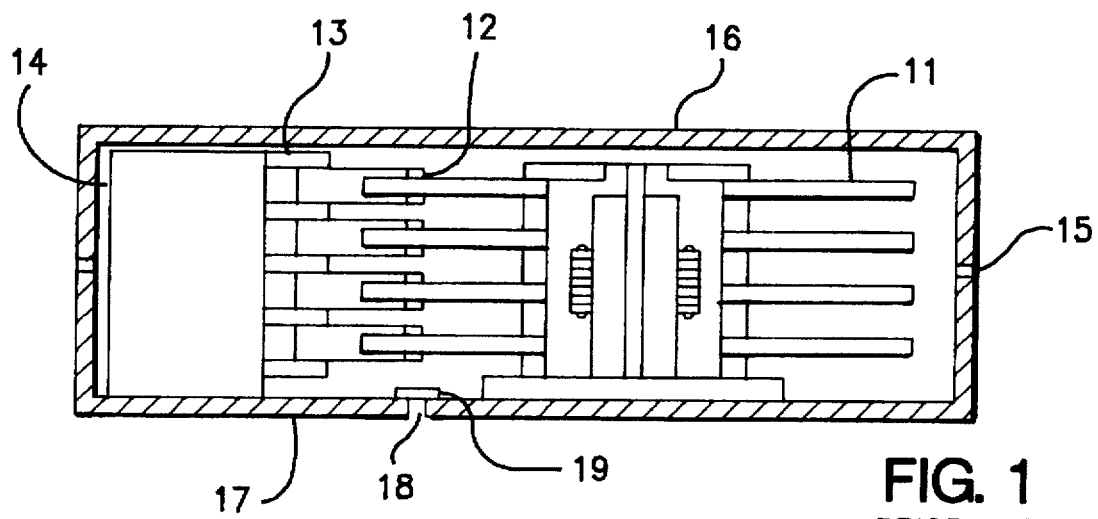
FIG. 1 is a cross sectional view illustrative of the conventional magnetic disk storage unit.
Figure 2:
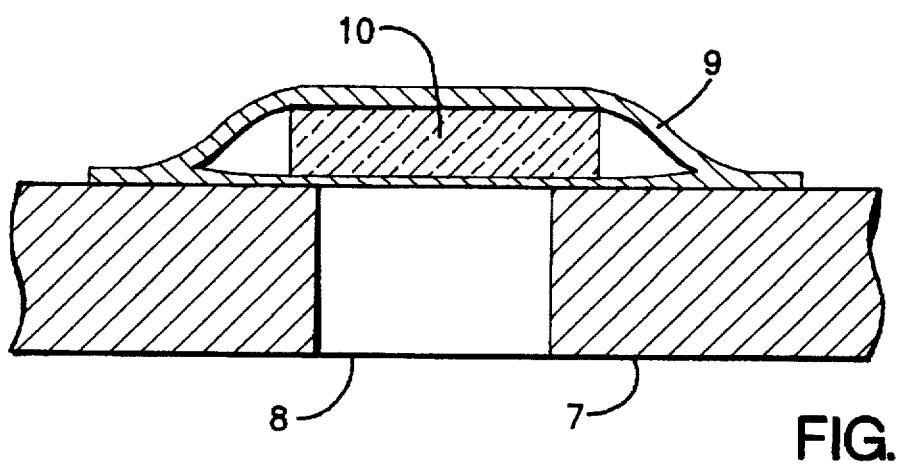
FIG. 2 is a fragmentary cross sectional elevation view illustrative of an improved gas adsorbent and a filter which are provided to cover an air hole provided in a base of a magnetic disk storage unit in a preferred embodiment according to the present invention.
Figure 3:
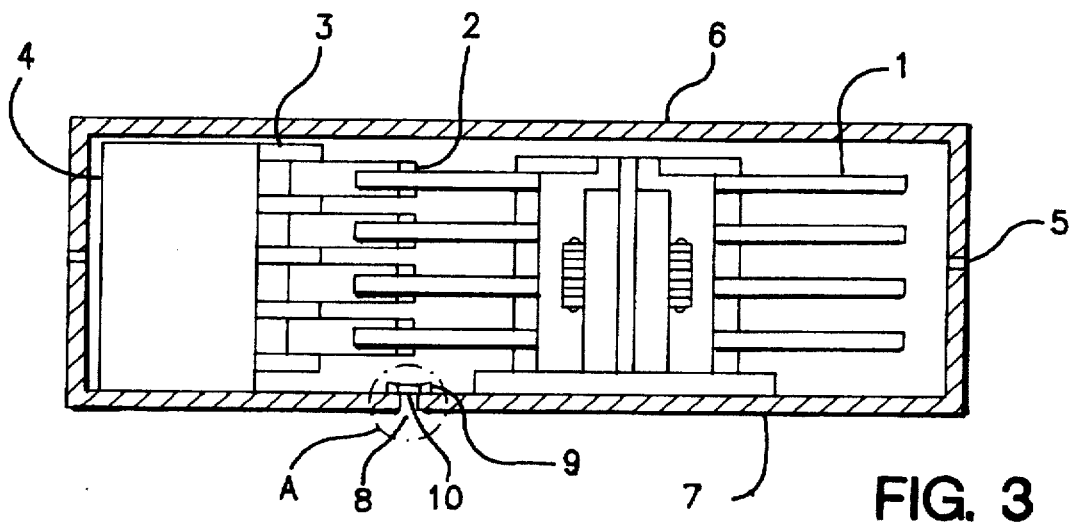
FIG. 3 is a cross sectional view illustrative of a magnetic disk storage unit in a preferred embodiment according to the present invention.

A preferred embodiment according to the present invention will be described in detail with reference to FIGS. 2 and 3, wherein a novel magnetic disk storage unit having an air hole which is provided with a filter supporting an improved gas adsorbent to harmful gases such as SOX and NOX.

The magnetic disk storage unit has a sealing container which accommodates a plurality of magnetic disks 1 for storage any information and a plurality of pairs of magnetic heads 2 being positioned to sandwich the corresponding magnetic disks 1 for recording/reproducing the information, but being floated from the magnetic disks 1 via gaps due to a high speed rotation of the magnetic disks 1. The magnetic heads 2 are supported by a carriage 3 which is driven by a motor 4 to do positioning of the magnetic heads 2. The sealing container comprises a base 7, on which the magnetic heads 2, the magnetic disks 1, the carriage 3 and the motor 4 are placed, and a cover 6 placed on the base 7. The cover 6 has gaskets 5 through which air can pass. The base 7 has an air hole 8 through which an air passes between interior and exterior of the magnetic disk storage unit.

The air hole 8 is provided with a filter 9 for preventing any dust from entering into the interior of the sealing container. The filter 9 has a double layered structure for supporting a gas adsorbent 10 comprising carbon fibers made from a high polymer having cyano groups, wherein the high polymer may, for example, comprise acrylonitrile high polymer.

The gas adsorbent 10 has a high adsorbing capability to harmful gases such as SOX and NOX.

Whereas the adsorbing process harmful gases such as SOX and NOX and the elimination thereof are reversible process to each other, it is preferable that the gas adsorbent 10 is capable of preventing an elimination of the harmful gases having once adsorbed onto the gas adsorbent 10. The cyano group has nitrogen having a lone electron-pair which facilitates a chemical adsorption of gases of inorganic compounds. It is generally to eliminate the gases of inorganic compounds having once adsorbed onto the gas adsorbent 10 comprising the activated carbon fibers having the cyano group.

The above magnetic disk storage unit has been placed to be exposed to a gas of 10 ppm of $NO_2$ mixed with 10 ppm of $SO_2$ for three months for subsequent measurement of concentrations of residual gases within the above magnetic disk storage unit as well as observation of corrosion of the magnetic disk. The measured results were mentioned on the following Table 1.

TABLE 1

| gas adsorbent | $NO_2$ | $SO_2$ | corrosion |
| --- | --- | --- | --- |
| No. 1 no activated carbon | 9 ppm | 9 ppm | entire corrosion |
| No. 2 silver particles | 9 ppm | 8 ppm | entire corrosion |
| No. 3 palm meal activated carbon particles | 2 ppm | 1 ppm | scattered corrosion |
| No. 4 cellulose fibers | 750 ppb | 500 ppb | partial corrosion |

TABLE 1-continued

| gas adsorbent | $NO_2$ | $SO_2$ | corrosion |
| --- | --- | --- | --- |
| No. 5 phenol fibers | 650 ppb | 600 ppb | partial corrosion |
| No. 6 acryl fibers | 70 ppb | 50 ppb | partial corrosion |

In the test No 1, the gas adsorbent free of activated carbon was used. The concentrations of the residual gases within the magnetic disk storage unit after three months were almost the same as those of the gases in the exterior. The magnetic disks were entirely corroded.

In the test No 2, the gas adsorbent which comprises silver particles was used. The concentrations of the residual gases within the magnetic disk storage unit after three months were nearly equal to those of the gases in the exterior due to a small total surface area of the silver particles. The magnetic disks were entirely corroded.

In the test No 3, the gas adsorbent which comprises palm meal activated carbon particles was used. The concentrations of the residual gases within the magnetic disk storage unit after three months were insufficiently reduced from those of the gases in the exterior. The magnetic disks were scatter-corroded.

In the test No 4, the gas adsorbent which comprises activated carbon fibers made from cellulose high polymer fibers was used. The concentrations of the residual gases within the magnetic disk storage unit after three months were certainly reduced from those of the gases in the exterior. Whereas the activated carbon fiber has a large capability of adsorption of the inorganic gas such as the harmful gases, the magnetic disks were partially corroded.

In the test No 5, the gas adsorbent which comprises activated carbon fibers made from phenol novolak high polymer fibers was used. The concentrations of the residual gases within the magnetic disk storage unit after three months were certainly reduced from those of the gases in the exterior. Whereas the activated carbon fiber has a large capability of adsorption of the inorganic gas such as the harmful gases, the magnetic disks were partially corroded.

In the test No 6, the gas adsorbent which comprises activated carbon fibers made from acrylonitrile high polymer fibers was used. The concentrations of the residual gases within the magnetic disk storage unit after three months were remarkably reduced from those of the gases in the exterior. Whereas not more than the amount of the activated carbon fiber is not less than one tenth of those of the other activated carbon atoms, the magnetic disks were free from any corrosion since the activated carbon fibers are made from high polymer having cyano groups which provides a larger capability of adsorption of the inorganic gas such as the harmful gases.

The above gas adsorbent 10 can prevent harmful gases such as SOX and NOX causing corrosion from entering into the magnetic disk storage unit.

Any high polymer activated carbon fibers having the cyano groups other than the acrylonitrile high polymer activated carbon fibers are available.

It is also possible to use the above high polymer activated carbon fibers having the cyano groups as inorganic gases such as harmful gases, for example, SOX and NOX for any other electric and electronics devices.

Whereas modifications of the present invention will be apparent o a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A magnetic disk storage unit comprising:

a sealing container;

at least a magnetic disk accommodated in said sealing container;

at least a magnetic head accommodated in said sealing container; and at least an air hole in the sealing container through which air passes to adjust a pressure of an internal gas within the sealing container; and a gas adsorbent screening said air hole and comprising activated carbon fibers having cyano groups for adsorption of at least an inorganic gas which is capable of corroding said magnetic disk.

2. The magnetic disk storage unit as claimed in claim 1, wherein said gas adsorbent is supported by a filter for dusts.

3. The magnetic disk storage unit as claimed in claim 1, wherein said inorganic gas includes at least one selected from the group consisting of an oxide of sulfur and an oxide of nitrogen.

4. The electric device as claimed in claim 1, wherein said inorganic gas includes at least one selected from the group consisting of an oxide of sulfur and an oxide of nitrogen.

5. An electric device having a sealing container for accommodating internal electric elements which are likely to be corroded by an inorganic gas, said sealing container having at least an air hole through which air passes to adjust a pressure of an internal gas within the sealing container, wherein said air hole is screened with a gas adsorbent comprising activated carbon fibers having cyano groups for adsorption of at least an inorganic gas which is capable of corroding said electric elements.

6. The electric device as claimed in claim 5, wherein said gas adsorbent is supported by a filter for dusts.

* * * * *